2,890,982

METHOD OF COMBATTING HELMINTHIASIS USING NITRO-FURYL-ACRYLATE DERIVATIVES

Michael P. Natt, Norwich, N.Y., assignor to The Norwich Pharmacal Company, Norwich, N.Y., a corporation of New York No Drawing. Application October 30, 1956
Serial No. 619,110

6 Claims. (Cl. 167—55)

This invention relates to the treatment of helminthiases and aims to provide a new chemotherapeutic method of combatting helminthiasis. It is a particular object of my invention to provide a chemotherapeutic treatment which can be employed effectively to combat the intestinal parasitic infection commonly known as pinworm infection.

Helminthiases, or worm diseases, not only affect a substantial number of persons but also present a serious agricultural problem by virtue of their occurrence in domestic animals and fowl. Agents which have been employed in the past in attempts to combat helminthiases have been subject to one or more of the following drawbacks: toxicity, prohibitive cost, equivocal chemotherapeutic response, emetic properties, failure to affect worms in both mature and immature forms, and unduly long periods of treatment have been required to effect favorable response. Also, auto-reinfection has been a common occurrence.

I have discovered that certain esters of 5-nitro-2-furylacrylic acid possess extraordinary anthelmintic properties and that it is possible to combat helminthiasis effectively by administering to the infected subject a chemotherapeutic composition containing, as active agent, such an ester of 5-nitro-2-furylacrylic acid, in combination with a carrier therefor. The esters of 5-nitro-2-furylacrylic acid which can be employed as such active agents in the practice of my invention may be represented by the following general formula:

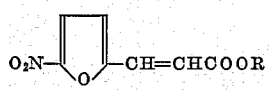

wherein R is an alkyl group containing from 1 to 6 carbon atoms.

The members of the group of esters of 5-nitro-2-furylacrylic acid which may be employed as active agents for combatting helminthiases in the practice of my invention differ from each other somewhat in degree of anthelmintic activity. A particular member of the group which I now prefer and which has been found to be particularly effective is ethyl 3-(5-nitro-2-furyl) acrylate. That compound can be prepared through the nitration of furylacrylate according to the procedure described by Gilman in the Journal of the American Chemical Society, 52: 2550 (1930).

Another method, which I now prefer, of preparing ethyl 3-(5-nitro-2-furyl) acrylate and which is also applicable, through the use of the appropriate alcohol, for the preparation of the other esters of 5-nitro-2-furylacrylic acid that can be employed as active agents in the practice of my invention, will be described briefly in order that my invention will be completely available to those skilled in the art.

EXAMPLE

In a 500 ml. flask fitted with a stirrer and reflux condenser are placed 200 ml. ethyl alcohol, 46 gm. (0.25 mole) of 5-nitro-2-furylacrylic acid and 5 ml. of concentrated sulfuric acid. The mixture is refluxed with stirring on a steam bath for six hours. It is then poured into 500 ml. of water and the resultant precipitate is filtered. This solid which weighs 53 gms. (M.P. 125–128° C.) is dissolved in chloroform, washed with sodium bicarbonate solution, then treated at boiling with charcoal and filtered and the solvent removed from the filtrate in vacuo to yield 44.2 gms. of ethyl 3-(5-nitro-2-furyl) acrylate which upon recrystallization from ethyl alcohol gives an M.P. of 124–126° C.

In the above example, there may be substituted for the ethyl alcohol an equivalent amount of methyl alcohol, propyl alcohol, butyl alcohol or amyl alcohol to produce, respectively, the methyl ester, propyl ester, butyl ester or amyl ester of 5-nitro-2-furylacrylic acid, each of which can be employed as the active agent of an anthelmintic composition in the practice of my invention.

The esters of 5-nitro-2-furylacrylic acid which can be employed in the practice of my invention possess a very low order of toxicity. An $LD_{50}$ from 1700–2400 mg./kg. is observed in mice. Dogs to which as much as 500 mg./kg. have been administered as a single dose have exhibited no toxic symptoms except for some emesis in a few instances. Animals which had been infected, either naturally or experimentally, with intestinal parasites have been treated effectively through the oral administration of anthelmintic compositions prepared in accordance with my invention in doses far below the toxic level. When such compositions were fed, at subtoxic doses, to mice infected with the species of pinworm known as *Syphacia obvelata*, whose sensitivity to oxyuracidal agents is known to be substantially the same as that for the species *Enterobius vermicularis* which causes pinworm infection in human beings, the worms were eradicated to the extent of 100% in some instances. The results of such treatment are illustrated by the following table:

Table I

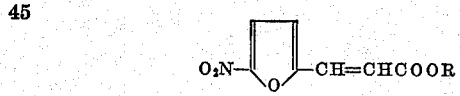

| Compound R= | Dose in mg./kg. b.i.d. for 4 days | No. of positive mice/ Total No. of mice | |
|---|---|---|---|
| | | Treated | Control |
| —CH₃ | 300 | 2/19 | 29/30 |
| —CH₃ | 100 | 6/20 | 29/30 |
| —C₂H₅ | 200 | 1/20 | 10/10 |
| —C₂H₅ | 100 | 10/10 | 10/10 |
| —CH(CH₃)₂ | 300 | 0/9 | 19/20 |
| —C₃H₇ | 300 | 0/9 | 19/20 |
| —C₄H₉ | 100 | 5/9 | 19/20 |
| —C₅H₁₁ | 300 | 5/9 | 19/20 |

A particularly valuable property of the anthelmintic compositions prepared pursuant to my invention is their equal effectiveness against both the mature and the immature form of the worm against which they are used. This is exemplified by the chemotherapeutic effect of the active ingredient ethyl 3-(5-nitro-2-furyl) acrylate upon the immature form of *Syphacia obvelata*, as illustrated by the following table:

*Table II*

| Compound | No. of Uninfected mice | Contact period with infected mice in days to induce infection | Days treated, 400 mg./kg. b.i.d. | | | | | | | | | | No. of mice infected with mature worms/total No. of mice |
|---|---|---|---|---|---|---|---|---|---|---|---|---|---|
| | | | 1 | 2 | 3 | 4 | 5 | 6 | 7 | 8 | 9 | 10 | |
| Ethyl 3-(5-nitro-2-furyl) acrylate | 10 | 2 | * | * | | | | | | | | | 1/10 |
| | 10 | 2 | | | * | * | | | | | | | 1/10 |
| | 10 | 2 | | | | | | * | * | | | | 2/9 |
| | 10 | 2 | | | | | | | | * | * | | 1/9 |
| | 10 | 2 | | | | | | | | | * | * | 0/10 |

The compositions of my invention may be readily prepared in suitable pharmaceutical dosage forms such as tablets, powders, capsules, liquids, and suspensions. Tablets may be prepared with tableting materials such as cornstarch, lactose, talc, stearic acid, magnesium stearate or with any of the compatible materials commonly used in pharmaceutical practice; capsules may be prepared using gelatin or other absorbable material for encapsulation; suspensions may be prepared using a non-solvent material such as an aqueous solution of methyl cellulose; and liquids may be prepared using propylene glycol. In the veterinary field, animal feeds may serve as the carriers in my compositions.

What I claim is:

1. The method of combatting helminthiasis which comprises the oral administration to an infected host of an anthelmintic composition containing as active agent a compound represented by the formula:

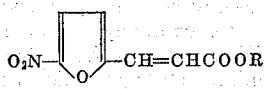

wherein R is an alkyl group containing from 1 to 6 carbon atoms.

2. The method of combatting helminthiasis which comprises the oral administration to an infected host of an anthelmintic composition containing as active agent methyl 3-(5-nitro-2-furyl) acrylate.

3. The method of combatting helminthiasis which comprises the oral administration to an infected host of an anthelmintic composition containing as active agent ethyl 3-(5-nitro-2-furyl) acrylate.

4. The method of combatting helminthiasis which comprises the oral administration to an infected host of an anthelmintic composition containing as active agent propyl 3-(5-nitro-2-furyl) acrylate.

5. The method of combatting helminthiasis which comprises the oral administration to an infected host of an anthelmintic composition containing as active agent butyl 3-(5-nitro-2-furyl) acrylate.

6. The method of combatting helminthiasis which comprises the oral administration to an infected host of an anthelmintic composition containing as active agent amyl 3-(5-nitro-2-furyl) acrylate.

References Cited in the file of this patent

UNITED STATES PATENTS 2,319,481    Stillman _____ May 18, 1943

OTHER REFERENCES

Okazaki: Chem. Abst., vol. 47, 1953, p. 12757f.